United States Patent [19]

Leclerco et al.

[11] Patent Number: 4,788,028
[45] Date of Patent: Nov. 29, 1988

[54] MACHINE AND METHOD FOR HANDLING A NUCLEAR FUEL ASSEMBLY

[75] Inventors: Joseph Leclerco, Saint Didier au Mont D'or; Jean-Claude Leroux, Villeurbanne, both of France

[73] Assignees: Framatome, Courbevoie; Compagnie Generale Des Matieres Nucleaires, Velizy Villacoublay, both of France

[21] Appl. No.: 917,650

[22] Filed: Oct. 10, 1986

[30] Foreign Application Priority Data

Oct. 11, 1985 [FR] France ................................ 85 15122

[51] Int. Cl.$^4$ ............................................. G21C 19/10
[52] U.S. Cl. .................................................. 376/264
[58] Field of Search ............... 376/262, 264, 268, 271, 376/272; 294/906; 414/146

[56] References Cited

U.S. PATENT DOCUMENTS

| | | | |
|---|---|---|---|
| 3,077,361 | 2/1963 | Tait et al. | 376/262 |
| 3,253,995 | 5/1966 | Antonsen et al. | 376/271 |
| 3,603,634 | 9/1971 | Kumpf | 376/264 |
| 3,904,048 | 9/1975 | Van Santen et al. | 376/271 |
| 4,177,386 | 12/1979 | Wachter et al. | 376/272 |
| 4,259,153 | 3/1981 | Pryamilov et al. | 376/262 |
| 4,410,485 | 10/1983 | Lippert | 376/262 |
| 4,448,744 | 5/1984 | Karger et al. | 376/262 |
| 4,676,945 | 6/1987 | Barkhurst | 376/264 |

FOREIGN PATENT DOCUMENTS 1464967  8/1970  Fed. Rep. of Germany .
1184488  7/1959  France .

Primary Examiner—Charles T. Jordan
Assistant Examiner—Daniel Wasil
Attorney, Agent, or Firm—Pollock, Vande Sande & Priddy

[57] ABSTRACT

A machine for handling nuclear fuel assemblies includes a horizontally movable platform having a vertical telescopic mast whose lower part has a gripper for gripping the upper end piece of the assembly. The mast has several vertical rigid elements ending with segments which bear laterally each on a face of the lower part of the assembly to be inserted. The shoes are independently retractable. They index and center the assembly during reloading already irradiated assemblies. The machine may be used for reloading fuel assemblies into a nuclear reactor.

2 Claims, 4 Drawing Sheets

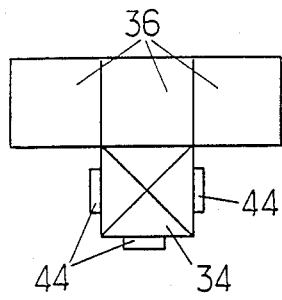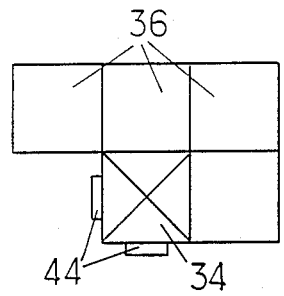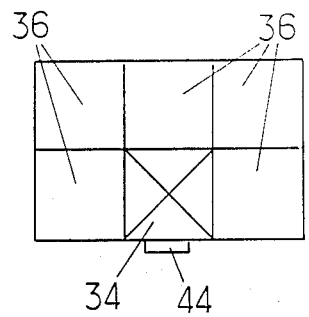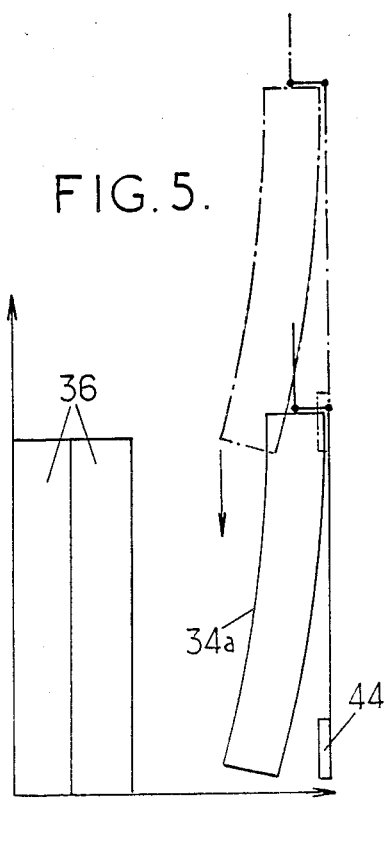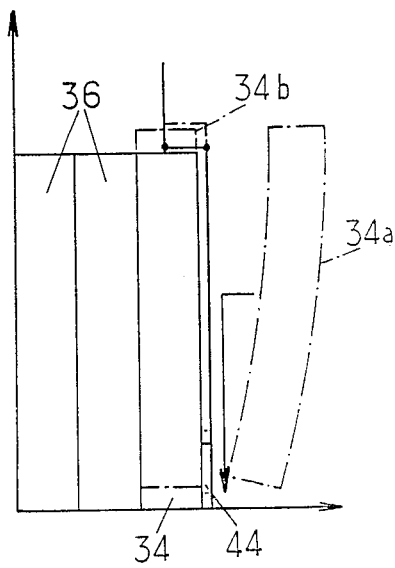

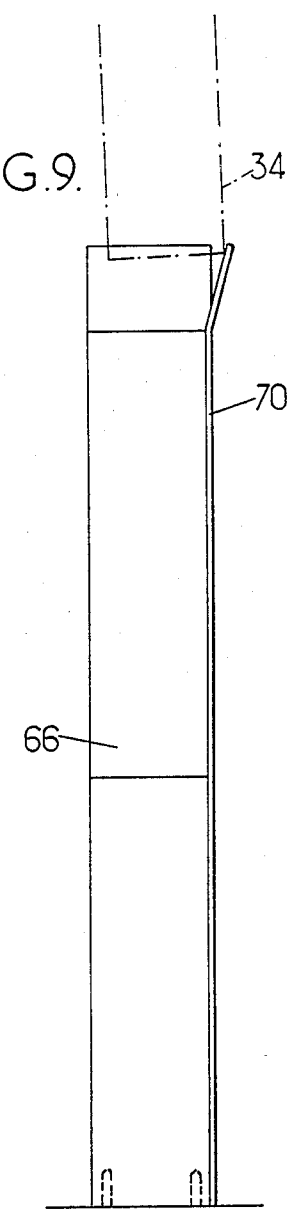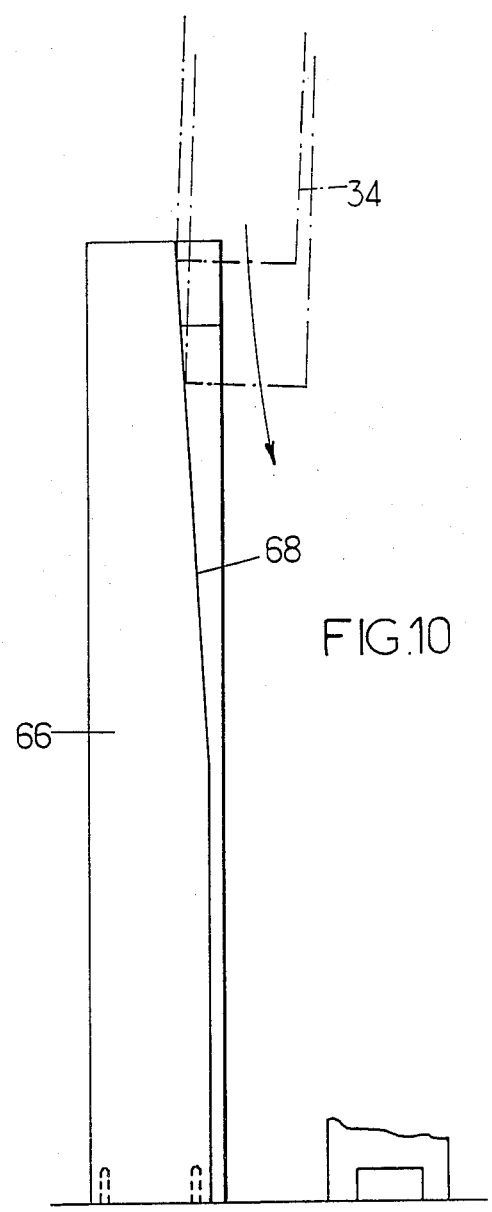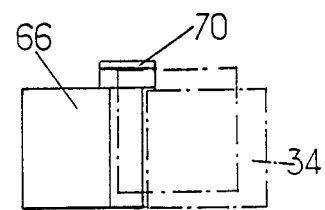

MACHINE AND METHOD FOR HANDLING A NUCLEAR FUEL ASSEMBLY

BACKGROUND OF THE INVENTION

1. Technical Field

The invention relates to nuclear fuel handling machines and the methods for using such machines. It is particularly suitable for reloading nuclear fuel assemblies in a reactor after they have undergone a first operating cycle which has left a sufficient fissile material content for them to be used again in another location of the core.

2. Prior Art

By way of example, in pressurized water reactors the core is formed by adjacent fuel assemblies of square cross-section disposed vertically and side by side. An advantageous method of operating such a reactor consists in dividing the core into three zones with different enrichment (each having for example 52 fuel assemblies). At the end of an operating cycle of the reactor, the spent fuel assemblies in one of the zones are withdrawn for reprocessing and are replaced with assemblies taken from another zone. The assemblies withdrawn from this second zone are replaced with other assemblies having undergone one operating cycle in the reactor. And, finally, the third zone is loaded with new assemblies. The transfers of irradiated fuel assemblies take place when the reactor is shut down and cold, after the cover of the vessel has been raised and the level of water, containing boric acid, in the pool surrounding the reactor has been brought to a sufficient level for biological protection and removal of the residual heat released by the assemblies.

This method of refuelling optimizes the fuel cycle. Reloading may be carried out with visual monotoring or using immersed TV cameras. Generally, reloading is carried out with a handling machine of the type having a horizontally movable platform and carrying a vertical telescopic mast whose lower part has a gripper for gripping the upper end piece or nozzle of an assembly.

When the fuel assemblies are of great length, which is quite frequent at the present time, inserting an irradiated fuel assembly may be impeded by the deformations which the assembly may have undergone during its first cycle in a reactor. Differential expansion of the sheaths in a typical fuel assembly four meters long having a square cross-section of 214 mm per side under irradiation may lead to axial buckling resulting in a laterial offset of 20 min. The insertion of the lower end piece of the assembly in the centering studs conventionally provided on the core support plate of the reactor then becomes difficult. In practice, the assembly to be inserted is laterally abutted against an assembly already in position and it is lowered, at a slow speed to reduce friction, while visually monitoring that there is no catching between adjacent grids. If it is found that the slope which the assembly takes due to the offset is too great, it is turned about a vertical axis so as to abut the opposite face. Such operations lengthen refueling and are a source of trouble.

SUMMARY OF THE INVENTION

It is an object of the invention to provide a handling machine for speeding up reloading. For that purpose, there is provided a machine of the above defined type, wherein the mast carries at least one (and usually a plurality of) rigid vertical elements ending with a bearing shoe intended to bear laterally against lateral surfaces of a lower part of an assembly suspended from the gripper, each element being independently retractable by moving it upwardly along the mast or disconnecting it.

With such a guide shoe, or shoes, the lower end piece of the assembly may be guided during lowering thereof into the core. A shoe is only placed on each of those sides which are not adjacent to assemblies already in the core. In the case where the assemblies have a square section, four shoes will typically be provided, each carried by a rigid rod.

Retraction of the shoes and of the rods which support them may be achieved in a number of different ways. For example, each elongated rigid element may be a rod provided with detachable members for fast connection to and removal from a lower part of the telescopic arm. Or each rod may be slidably supported by the lower part of the mast for movement with respect thereto between two end positions, one in which the shoe is above the level of the upper end piece of a fuel assembly suspended from the gripper, the other in which the shoe extends down as far as the lower end piece of the fuel assembly.

In a modified embodiment, the rigid element has an in plan view, identical to when viewed from the above, identical to that of an assembly, and has means for connection with the gripper and lower pins shaped to be engaged in water inlet openings of a core support plate of a reactor. The element then has at least one slanting lateral face forming a bearing shoe for slidably receiving the end part of an assembly.

There is also provided a method of loading a nuclear fuel assembly in a reactor, into a position of the core adjacent a position already occupied by another fuel assembly. The method comprises the steps of placing a shoe against each lateral face of the fuel assembly other than the one (or each of those) facing an occupied position, lowering the assembly at high speed from a position remote from its final position to a position in the vicinity of its final horizontal position, moving the assembly to be inserted laterally to its final position, and lowering the assembly to its final level.

BRIEF DESCRIPTION OF THE DRAWINGS

The invention will be better understood from the following description of particular embodiments, given by way of example. The description refers to the accompaning drawings in which.

FIGS. 2, 3 and 4 are schematic plan views as seen showing different situations which may occur during reloading of a fuel assembly;

FIGS. 5 and 6 are elevational diagrams showing the movements when positioning an assembly using the machine of FIG. 1;

FIGS. 9, 10 and 11 show a third embodiment, respectively in elevation, in left hand side view and in plan view.

DETAILED DESCRIPTION OF PREFERRED EMBODIMENTS

Figure 1:
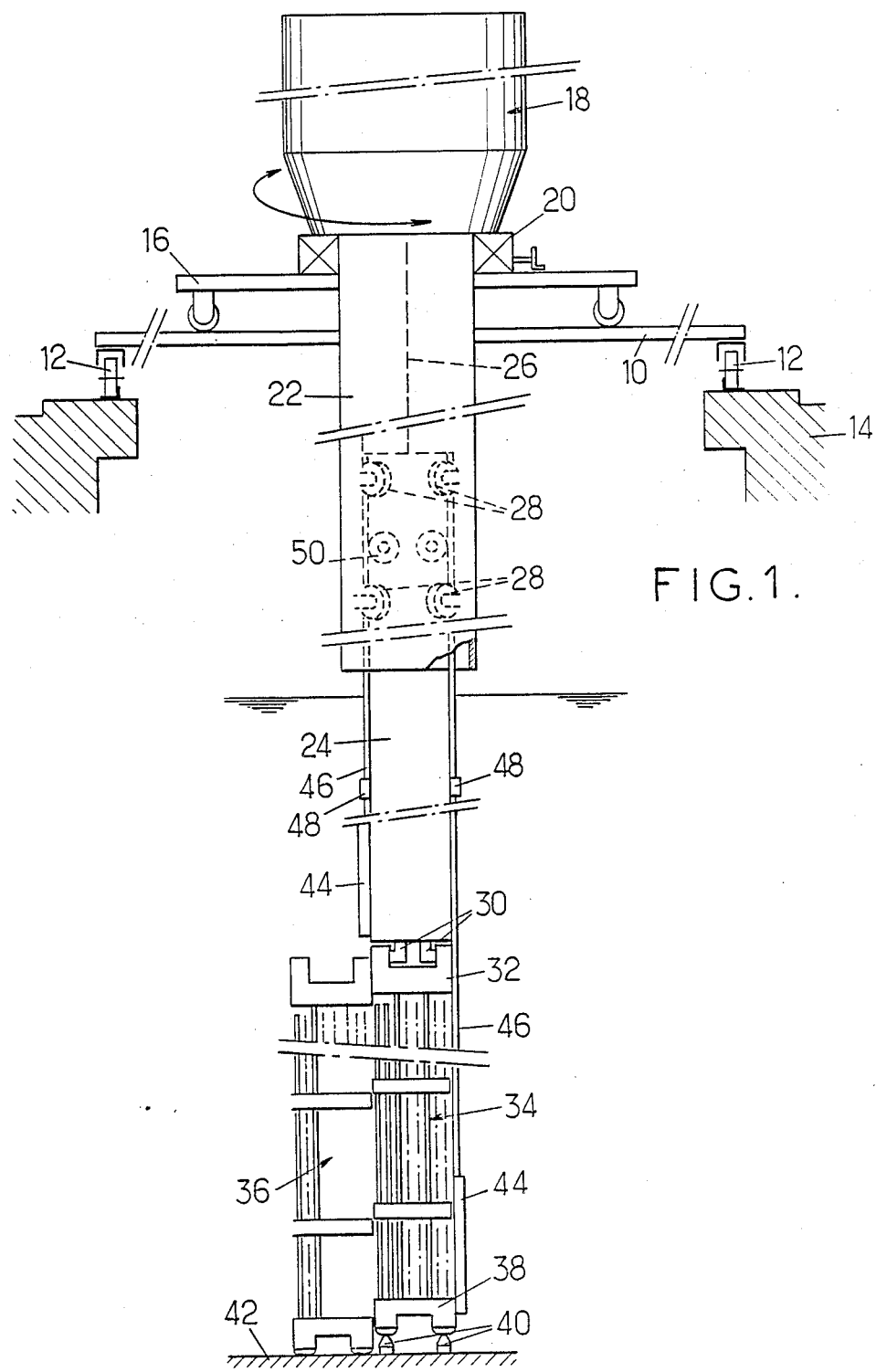
FIG. 1 is a schematic elevation view showing the construction of a handling machine according to a first embodiment of the invention.

FIG. 1 (which, for the sake of clarity, is not in scale), shows a refuelling machine of generally conventional construction. It includes a platform 10 having wheels 12 for travelling over rails provided on the edges 14 of the pool in which the pressure vessel (not shown) containing the core of a reactor is placed. The platform carries rails for a carriage 16 travelling in a direction orthogonal to the direction of movment of the platform. A vertical mast 18 is supported on carriage 16 by a mechanism 20 for rotating the mast about the axis thereof. The mast has a cylindrical barrel 22 rotatably carried by the carriage but fixed in vertical direction. The barrel accomodates different control and regulation members, particularly a winch (not shown) for lifting and lowering a telescopic tube 24 forming the lower part of the mast. FIG. 1 shows schematically a cable 26 from which the tube 24 is suspended. The latter is slidably guided inside barrel 22 by means shown schematically as rollers 28 placed at a plurality of different levels. The rollers may further be arranged for connecting tube 24 to barrel 22 against mutual rotation.

Tube 24 has, at its lower end, a lifting tool including a gripper only the jaws 30 of which are shown. The jaws are such as to be able to lock on the upper end piece or nozzle 32 of a fuel assembly 34 to be inserted in the core, against an adjacent fuel assembly 36 already in position. During the final phase of insertion of fuel assembly 34, its lower end piece or nozzle 38 must engage or centering and indexing pins 40 provided on the core support plate 42.

The features of the machine which have just been described are relatively conventional. It is suitable for moving vertically and horizontally fuel assemblies 34 having a square section. It is associated with different units for measuring and controlling the amounts of movement and with viewing units such as television cameras.

Referring to FIG. 1, a machine according to the invention further includes guide means comprising four elongated elements each arranged to cooperate with one lateral surface of assembly 34. Each elongated element has an end shoe 44 of such shape that it can bear on the lower part of assembly 34. In practice, this shoe may be a plate slightly narrower than one of the sides of the fuel assembly and it is arranged for abutment against the lower end piece 38 and a fraction of the bundle of fuel rods in the assembly. Shoe 44 is fixed to a drive rod 46 having a cross-section such that it has sufficient resistance to bending. The rod may be an extruded section and be maintained applied against telescopic tube 24 by guides 48.

Each elongated rigid element is movable between an active position shown at the right hand part of assembly 34 in FIG. 1 and a retracted position. When the rigid element on one side is retracted, the assembly carried by the gripper may be brought to a position adjacent an assembly 36 already in position. For that purpose, each rod 46 may be provided with means for rapid connection onto the telescopic tube 24. It is also possible, as shown schematically in FIG. 1, to provide each rod 46 with a mechanism for moving it vertically with respect to the tube 24 between the lower position shown at the right of assembly 34 and the higher position shown at the left of assembly 34. Each mechanism may be a rack and pinion assembly 50 or any other appropriate electrically or fluid pressure controlled lockable mechanism.

A refuelling method using the machine which has just been described involves a first step of locating an appropriate number of shoes (depending on the number of positions adjacent that of assembly 34 to be inserted which are already occupied by other assemblies 36) in active position. Referring to FIG. 2, when three lateral faces of the assembly remain free, three shoes out of four may be used for guiding the assembly. When the assembly 34 is to be inserted in a corner left free by two assemblies 36 already in position, two faces only are free and may cooperate with shoes 44 (FIG. 3). Finally, when the assembly 34 is to be inserted in a position which may be accessed from only one side, a single shoe 44 will be placed in active position (FIG. 4).

The sequence of operations to be carried out remains the same in all cases (except when an assembly is to be inserted in a space between eight assemblies in position). The fuel assembly suspended from the telescopic mast is first of all lowered into a position laterally offset with respect to the assemblies already in position 36 so as to avoid interference therewith. Such lowering, up to position 34a shown in FIG. 5, may be carried out at high speed. The level of the fuel assembly in position 34a is so selected that the lower end piece is above the level of the centering pins of the core support plate 8.

Then the assembly is laterally moved into position 34b, directly above the final position which is to occupy. During this transverse displacement, the lower part of the assembly comes into abutment against shoe 44 if it was initially spaced therefrom (position 34b in FIG. 6). Insertion is then finalized by lowering the telescopic tube at low speed as compared with the initial lowering speed until position 34a. The operation is monitored to make sure the assembly engages into the centering pins 40.

In practice, the gain in time for inserting a fuel assembly placed in a position as shown in FIG. 2 or in FIG. 3 is of about 5:1. The gain is lower if the arrangement is as shown in FIG. 4, since a centering shoe is only located on one side and the usual problems due to possible offcentering in the direction perpendicular to that in which the shoe may exert a centering force are found again.

Figure 7:
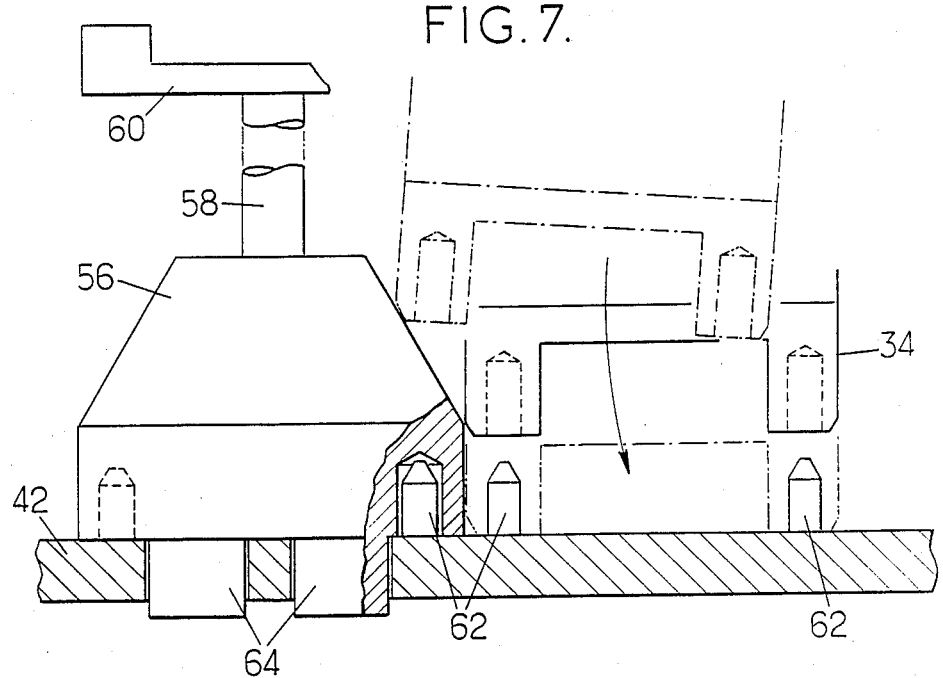
FIG. 7 is an enlarged elevational view showing a rigid element constituting a second embodiment.
Figure 8:
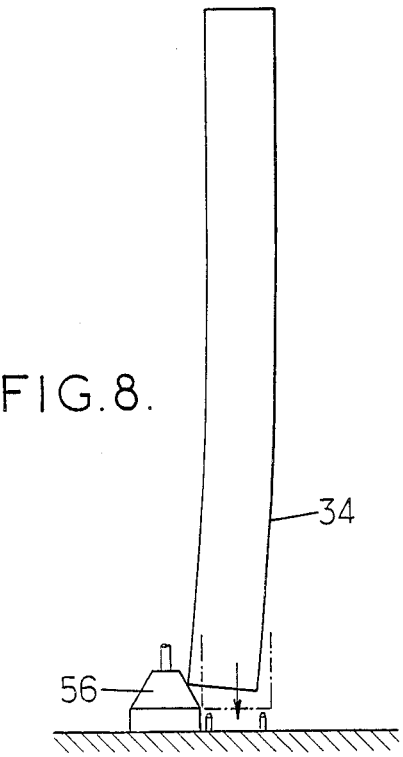
FIG. 8 is an elevational diagram showing use of the embodiment of FIG. 7.

In the modified embodiment of FIGS. 7 and 8, the rigid element is formed by a unit which can be gripped and handled by the mast and is arranged to be placed at a position adjacent that to be given to the assembly to be inserted. Referring to FIG. 7, the unit has a base 56 of frusto-pyramid shape in its upper part, having a lower portion whose cross-section is identical to that of a fuel assembly. Base 56 is fixed to an upwardly extending rod 58 with a gripping head 60. Blind holes are formed in the base for receiving the assembly centering pins 62 conventionally provided on the core support plate 42 of the reactors. So that lateral guide forces are not taken up by these pins, the base 56 also has lugs 64 which engage in the water inlet holes provided for the assemblies in the core plate. By placing one unit (or more) in a position (or positions) adjacent that which an assembly 32 to be inserted is to occupy, the fuel assembly 34 is guided during lowering thereof and it can be brought to its correct position, as can be seen in FIGS. 7 and 8. For that purpose the slope of the pyramid should be sufficient (60° at least in general).

In FIGS. 9 to 11, the rigid member forms a dummy assembly having blind holes and lugs (not shown) in the same position as on a true fuel assembly. The member has a body 66 whose face 68, adjacent the position which is to receive assembly 34 to be inserted, forms a slanted ramp. A convergent guide 70 is fixed on a face adjacent ramp 68.

Numerous other modifications of the invention are possible and it may apply to fuel assemblies having a shape other than square, and in particular those having a hexagonal shape.

We claim:

1. In a nuclear reactor having:

a core support plate, a plurality of sets of indexing pins fixed to said core support plate and of water inlet passages formed in said core support plate, each said set defining a fuel assembly receiving position and all said fuel assembly receiving positions being mutually adjacent, and a plurality of identical vertical fuel assemblies of square horizontal cross-section supported by said core support plate each at one of said fuel assembly receiving positions, each having a lower end nozzle shaped for engaging the pins of a respective one of said sets, a fuel assembly handling system comprising, in combination:

a handling machine having a platform mounted for controlled horizontal movement above the core; a mast carried by said platform and having a vertically movable gripping tool, arranged for connection to an upper portion of a fuel assembly;

at least one vertically elongated rigid element constituting a dummy assembly having a body formed to be received by said core support plate at one of said mutually adjacent fuel assembly receiving positions, provided with lower lug means so shaped as to be engageable in said water inlet passages of a respective one of said sets and with means for connection with said gripping tool, said body being defined by three vertical sides and by a fourth side intended to be located adjacent to a fuel assembly receiving position for a fuel assembly to be inserted and which is slanted upwardly and inwardly over substantially the whole of its height, the cross section of said dummy assembly at the lower end thereof being substantially identical to that of a fuel assembly.

2. Machine according to claim 1, wherein said dummy assembly includes an inlet guide on a face adjacent the slanting face.

* * * * *